E. Hale Jr.
Dentistry.
N° 92,605.   Patented Jul. 13. 1869

Witnesses.
Wm M Eeds
A V Chafer

Inventor.
Edw<sup>d</sup> Hale Jr

United States Patent Office.

EDWARD HALE, JR., OF ST. LOUIS, MISSOURI, ASSIGNOR TO HIMSELF AND JOSHUA H. ALEXANDER, OF SAME PLACE.

Letters Patent No. 92,605, dated July 13, 1869.

IMPROVEMENT IN MEANS OF ATTACHING ARTIFICIAL TEETH TO THEIR BASE-PLATES.

The Schedule referred to in these Letters Patent and making part of the same.

*To all whom it may concern:*

Be it known that I, EDWARD HALE, Jr., of the city and county of St. Louis, State of Missouri, have invented a new and useful Improvement in Attaching Artificial Teeth to Base-Plates; and that I do hereby declare the following to be a full and exact description of the same, reference being had to the annexed drawing, and letters marked thereon.

The nature of my invention consists in forming a perforated channel around the outer edge of the roof of the base-plate, so it will hold the rubber, or other pliable substance to which the teeth are attached.

Figure 1:
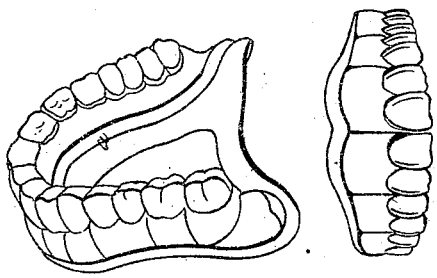

Figure 1 represents a perspective view of the upper side of the mouth-plate, to which the teeth are attached by means of rubber.

*a* is the elevation of the channel on the outside or under side of the base-plate.

Figure 2:
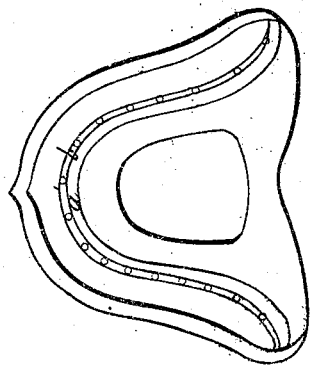

Figure 2 represents the side of the plate next the mouth, and *a*, in said figure, shows the channel where rubber is deposited.

*b* shows the holes which form the connection of rubber in the channel with the rubber on the outside and next the teeth, to which rubber the teeth are fastened in the ordinary way.

Figure 3:
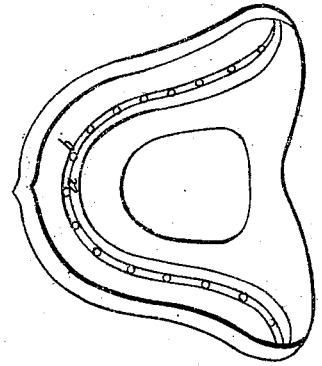

These small holes are provided throughout the channel, as seen in figs. 2 and 3.

Figure 3 shows the ridge formed by the depression or channel on the under or outside of the plate, that is, the side next the tongue.

The channel is represented by *a*, in fig. 2, but shown on the opposite side of the base-plate.

The channel serves two purposes, one to provide a continuous connection of rubber on the upper side of the plate, which forms, through the holes in the channel, a connection with the rubber next the teeth, and thus provide a rigid attachment of the teeth to the plate, and it also gives strength to the plate, by furnishing an inner rim to the same.

This method of attaching the teeth to the base-plate is especially good in connecting teeth to aluminum plate, which cannot be soldered to the teeth, or any other metal in use for dental purposes, thus enabling one to attach the teeth to the base-plate by packing with any pliable substance, or by running in any fusible metal, and dispensing with solder in all its forms, which, when used, is apt to warp the plate.

What I claim as new, and for which I ask Letters Patent of the United States, is—

A base for artificial teeth, provided with a channel, *a*, and perforations *b*, for the reception of the vulcanite, by which the teeth and plate are united, substantially as described.

EDW. HALE, JR.

Witnesses:
WM. M. ECCLES,
GEO. W. HALL.